May 8, 1945. R. T. CLOUD 2,375,283
AMPLIFICATION CONTROL IN SEISMIC SURVEYING
Filed May 21, 1937 3 Sheets-Sheet 1
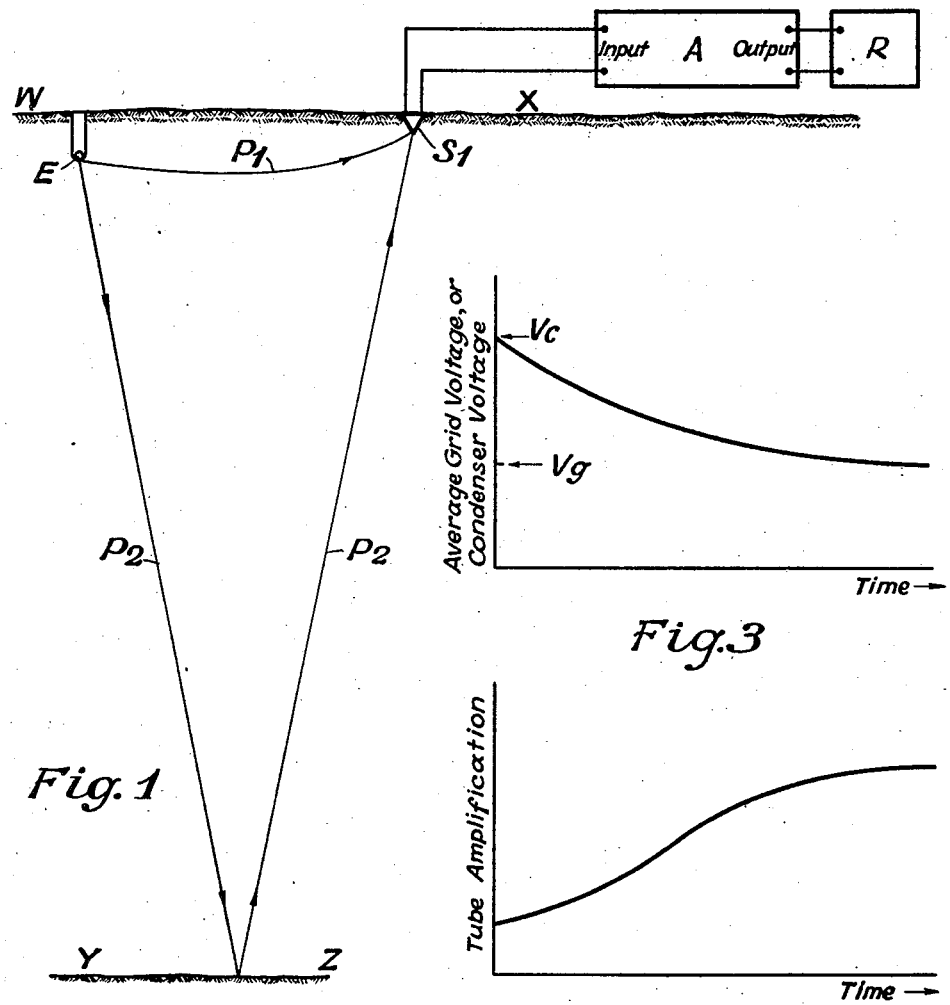

Inventor
Raymond T. Cloud
Geo. L. Parkhurst
Attorney

Inventor
Raymond T. Cloud
BY
Attorney

Patented May 8, 1945

2,375,283

UNITED STATES PATENT OFFICE 2,375,283

AMPLIFICATION CONTROL IN SEISMIC SURVEYING

Raymond T. Cloud, Los Angeles, Calif., assignor, by mesne assignments, to Stanolind Oil and Gas Company, Tulsa, Okla., a corporation of Delaware Application May 21, 1937, Serial No. 144,053

8 Claims. (Cl. 177—352)

The present application is a continuation-in-part of my application Serial No. 40,105 filed September 11, 1935, now abandoned.

My invention relates to new and useful improvements in the art of determining the position and/or slope of sub-surface geological strata by means of seismic waves. More particularly it relates to new and useful improvements in systems used to amplify electrical effects generated by the impingement of seismic waves on seismometers.

It is an object of my invention to provide means and methods whereby improved records of seismic waves can be obtained. Another object of my invention is to provide means and methods whereby both refracted and reflected seismic waves generated from a common source can be recorded in a single operation. Still another object of my invention is to provide improved means and methods whereby the foregoing objects can be accomplished automatically and in an improved manner.

A further object of my invention is to provide improved means and methods for varying the sensitivity of devices used to amplify electrical waves by thermionic means in seismic surveying. Another object of my invention is to provide means and methods for automatically and continuously increasing the amplification of a thermionic amplifier circuit at the will of the operator in the art of seismic surveying.

Other and more detailed objects of my invention will become apparent as the description thereof proceeds.

My invention will now be described with particular reference to the accompanying drawings which form a part of this specification and which illustrate certain specific embodiments of my invention. Other embodiments will be apparent to those skilled in the art and it is to be understood that I am not limited to the specific embodiments shown and described.

The drawings are diagrammatic illustrations and are not drawn to scale. The various figures may be described as follows:

Figure 1 illustrates the general set-up used in seismic surveying by the reflection method;

Figure 2 represents an improved amplifier circuit in accordance with my invention;

Figure 3 is a graphical representation of the variation of the average control grid voltage of the thermionic amplification means when operating in accordance with my invention;

Figure 4 is a graphical representation of the variation in amplification when operating in accordance with my invention.

Figure 5:
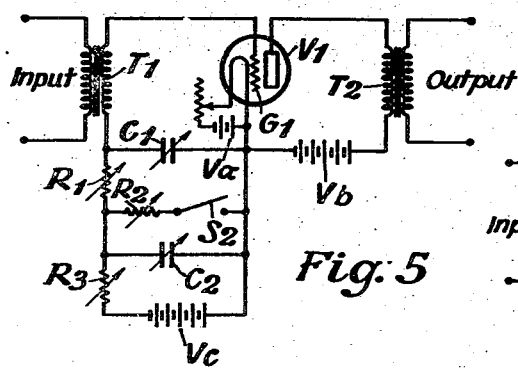
Figures 5, 6, 7, 8, 9 and 10 represent alternative improved amplifier circuits in accordance with my invention.

Referring now more particularly to the drawings it will be seen that Figure 1 illustrates the usual seismic surveying operation using the reflection method in which the position and/or slope of subsurface geological strata are determined by detonating a charge of explosive at or near the surface of the earth, detecting the waves reflected from the underlying stratum or strata after these waves have reached one or more seismometers located at or near the surface of the earth, and amplifying and recording the records of the resultant electrical impulses. Various detailed methods of accomplishing this result are well known to those skilled in this art and need not be discussed here. In all of these reflection methods of geophysical prospecting the sequence of events occurring at a seismometer is usually the same.

This sequence of events can best be described by further detailed reference to Figure 1. The detonation of the explosive charge E sends out seismic waves in all directions. The first waves to reach the seismometer $S_1$ will usually be those that are refracted through the earth from E to $S_1$, roughly as shown by path $P_1$. As a result of the same explosion, waves travel along or near the surface of the earth W—X to seismometer $S_1$ and still other waves are reflected from an underlying stratum Y—Z along the path $P_2$. Usually the distances and velocities are such that the refracted wave will be followed in sequence by the surface waves and the reflected waves. Thus the recorded electrical impulses from seismometer $S_1$ will show first a high energy refracted wave, then a surface wave, and finally the useful reflected waves, usually of low energy compared with the former two waves.

It will be understood that seismometer $S_1$ may be of any type adapted to convert seismic waves impinging on it into electrical variations. I prefer to use a seismometer of the well known transducer type although other types, for instance piezo-electric seismometers can be used. These electrical variations are amplified in one or more stages by amplifier A and are recorded by recorder R which can be of any known type. One preferred type of recorder comprises an oscillograph string or coil which moves in accordance with the variations in the electrical waves from amplifier A impressed on it. The movements of this oscillograph element are suitably recorded photographically as "traces" on a moving sensitized strip in accordance with well known methods.

It will likewise be understood that while a single seismometer is shown for simplicity, a plurality of spaced seismometers can and usually will be used for comparative purposes in accordance with any of the known procedures.

The reflection method of geophysical prospecting depends on the analysis of the records of the reflected waves, and the determination of the instant of arrival of these waves at the seismometer or seismometers. Furthermore, in order to make certain "weathering" corrections to be applied to the times of arrival of the reflected waves, it is also necessary or at least highly desirable to determine the instant of arrival of the refracted waves which, as previously mentioned, are usually the first to reach the seismometer or seismometers. Thus it is highly desirable that the record show the arrival of the first refracted wave as well as all reflected waves. This means that there must be a recording of the first high energy waves as well as the later low energy waves. Instruments sensitive enough to give the required recording amplitude of the later low energy waves would be damaged by the impulses from the first high energy waves, and even in those cases where they might not be damaged, the amplitudes of the early refracted waves would be so large as to be completely off-scale on the oscillograph trace, and thus would not be readable. For this reason it is desirable to have some method or device whereby the recording sensitivity of the combined amplifier and recorder will be low for the waves that first reach the seismometer and high for the later reflected waves. As the reflected waves are usually the last to be recorded, this object can be secured by a device which changes the sensitivity of the amplifying and recording apparatus with time in such manner that the recording sensitivity is low during the initial period, and increases during the later period in which the lower energy waves are recorded.

Furthermore, since the energy level of the waves reflected from relatively shallow strata is, in general, greater than that of the waves reflected from the deeper strata, the recording circuits should be so adjusted that there is a gradual increase in sensitivity as the signals come in from deeper and deeper strata, in order that the interpretation of the records of all reflected waves can be made with equal facility.

The prior art methods of reducing the recording strength of the impulses from the early high energy waves are of two general types. The cruder method involves nothing more than rendering the recorder inoperative for a certain period after the explosive has been detonated. This is highly disadvantageous in that reflected waves from shallow formations, which arrive before the last of the refracted or surface waves have died down, are not recorded at all, and the possibility of prospecting shallow underlying strata is lost. Second, the trace of the arrival of the initial refracted wave is not secured, which is a grave disadvantage in the interpretation of the data, and in fact makes certain highly desirable "weathering" determinations impossible, as will be readily recognized by those skilled in this art. Again, the sudden switching on of the apparatus introduces undesirable and sometimes harmful transient effects in the amplifier and recorder.

The second method makes use of an impedance network placed between seismometer and amplifier which reduces the sensitivity of the recording until it is switched out of the recording circuit. This method is an improvement over the first one, but still gives an abrupt increase in sensitivity, which is much less desirable than a gradual shift. Also, the reflections from shallow underlying strata may be lost in the low sensitivity part of the record.

Finally, success in the operation of either of these methods depends upon the skill and ability of the operator to switch on the increased sensitivity soon enough to amplify the reflected waves and late enough to avoid either damaging the sensitive recording elements or obtaining traces of too great amplitude by imposing on these elements large amplitude impulses due to high energy waves. Constant experimentation and much skill are required to achieve successful results. A system of automatic increase of sensitivity as the energy of the waves decreases is much superior to any of these methods in current use.

It can be seen from the previous discussion that the incorporation in the recording circuit of any of the various devices now commercially available and often used in radio applications under the general name of "automatic volume controls" are not desirable for use in this connection, since these devices give sensibly equal output amplitudes for widely varying input amplitudes which renders interpretation of these records difficult. Also, these devices do not change the amplification of the system until after passage of one or more cycles of current differing from the designed average value. The extremely sensitive recording elements can be easily damaged if this type of device is used, in that at least one high amplitude impulse will reach the recording element before the amplification is reduced. The method of operation should be such that the sensitivity or amplification of the waves will increase gradually and smoothly during the recording period in a definite manner, so that the increase in sensitivity during this period is in accordance with the requirements previously discussed.

In brief, the device of my invention comprises a circuit which varies the average voltage applied to the control grid of a thermionic vacuum tube used as an amplifier of the seismometer signals. This variation of average control grid voltage changes the amplification of the tube and hence varies the over-all sensitivity of the amplifier and therefore of the recording system. The rate of variation, initial and final control grid potential, and time at which the change commences are adjustable by the operator.

The most elementary form of my invention is shown in Figure 2 which corresponds to amplifier A in Figure 1. Figure 2 will now be described in detail. The input from the seismometer is suitably led through transformer $T_1$ to an amplifier circuit and the amplified electrical waves pass through transformer $T_2$ to further amplification stages or directly to recorder R.

The amplifier circuit includes a thermionic vacuum tube $V_1$ which may suitably be of the triode type as shown. Tube $V_1$ is equipped with the usual "A" battery $V_a$ and "B" battery $V_b$.

My invention deals in particular with the grid circuit of tube $V_1$, the nature of which will be apparent. When switch $S_2$ is open, condenser $C_1$ is charged to the voltage of the grid battery $V_c$. The average voltage on control grid $G_1$ of vacuum tube $V_1$ will be substantially that across condenser $C_1$. When switch $S_2$ is closed, condenser $C_1$ will tend to discharge through resistances $R_1$ and $R_2$. The ultimate value of the voltage across condenser $C_1$ (when the condenser has discharged as fully as it will) and hence the final value of the average control grid voltage will be equal to the final value of the voltage across resistance $R_2$, and will be given by the expression $$V_g = V_c \frac{R_2}{R_2 + R_3}$$

The rapidity with which the condenser $C_1$ discharges from the initial value $V_c$ to the final value $V_g$ is governed by the resistances $R_1$, $R_2$ and $R_3$ and the capacity of the condenser. The typical form of the plot of condenser voltage against time after switch $S_2$ is closed is as shown in Figure 3.

The amplification of a vacuum tube operated at constant average plate voltage is a function of the average negative grid voltage, and increases as the average negative grid voltage decreases in a manner well known to those skilled in the art. Thus, the amplification of the tube $V_1$ increases as the average grid voltage decreases (i. e., after the switch $S_2$ is closed) in general as shown in Figure 4. The shape of this curve depends upon the type of vacuum tube used and the voltages of the various electrodes, but in any case the amplification will increase gradually from the initial to the final value. This result is particularly true where tubes of the type known as variable-mu are used; these having the grid wires spaced at varying distances apart.

The methods of coupling the input signal in the grid circuit and coupling the plate circuit to the recorder or further amplifying circuits are not portions of this invention, and may be of any of the many types used for this purpose. In Figure 2 the coupling is secured by transformers $T_1$ and $T_2$, but could be obtained by resistance coupling, etc.

It will now be seen that by proper choice of values of the circuit constants, $R_1$, $R_2$, $R_3$, $C_1$, and the voltage of the grid battery $V_c$, the initial and final amplification of the tube $V_1$ and the period of time during which the variation takes place can all be selected by the operator. The variation will be gradual throughout the shift, and there will be no sudden changes in amplification. The time at which the variation is initiated is under the control of the operator. Thus, the objects set out in the previous pages as desirable characteristics of the recording circuit are secured.

Figure 8:
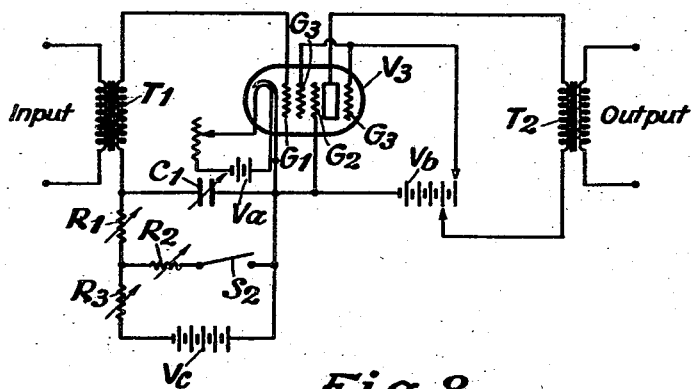

Various values of the circuit constants can readily be calculated or determined by experiment to satisfy any desired conditions. However, a set of constants which I have found to be suitable with the type of tube shown in Figure 8 is as follows:

$R_1$  400,000 ohms,
$R_2$  45,000 ohms,
$R_3$  100,000 ohms,
$C_1$  1 microfarad and
$V_c$  45 volts.

The circuit elements $R_1$, $R_2$, $R_3$, and $C_1$ can, if desired, be made adjustable or variable as shown.

The switch $S_2$ can be operated manually or can be operated by a relay of either mechanical or vacuum tube type. It can be closed by the same operation which detonates explosive E or, preferably, its closing can be delayed by suitable means for a short time after explosive E is detonated. Thus the closing of the switch may be delayed until just after the refracted waves reach the seismometer. In any event, however, the time at which the amplification change is initiated is under the control of the operator.

Although the elementary form of my invention shown in Figure 2 accomplishes the purpose of gradually increasing the amplification, I prefer to modify this form slightly to make the circuit operate still more advantageously. The average plate current at constant average plate voltage is a function of the average grid voltage and increases as the negative grid voltage decreases. The rate of decrease of control grid voltage in my circuit is greatest the instant the switch $S_2$ is closed, therefore the rate of change of average plate current is a maximum at that time. This change of average plate current may be sufficient to be objectionable, since it may cause a signal in the recorder which will, of course, give a false reading on the instrument. This difficulty can be eliminated in several ways. Any method which causes a gradual change in control grid voltage just after switch $S_2$ is closed will accomplish the desired result.

Figure 6:
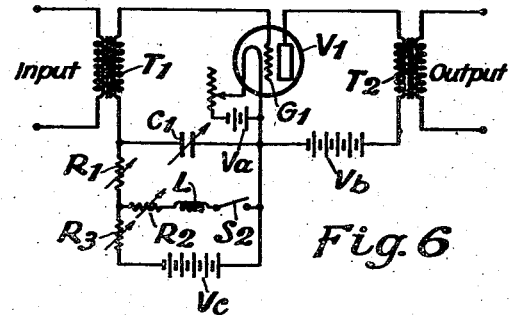

Two methods of doing this are shown in Figures 5 and 6 respectively. These figures, like Figure 2, correspond to amplifier A in Figure 1.

Figure 5 is identical with Figure 2 except that a second condenser $C_2$ has been placed in shunt across resistor $R_2$ and switch $S_2$. This condenser $C_2$ has a greater capacity than does condenser $C_1$. When switch $S_2$ is closed, both condensers discharge through resistance $R_2$ to the final voltage $V_g$ given on a previous page. Since condenser $C_2$ is of high capacitance, a large current will flow through the resistance $R_2$ and the drop of voltage across it will be greater than when condenser $C_2$ is not used. Due to this increased drop of voltage, condenser $C_1$ will discharge more slowly, and the initial rate of change of grid voltage will be less than before. By the choice of a condenser of proper capacitance, this initial rate of change of grid voltage can easily be made low enough to avoid objectionable signals in the recorder. Since condenser $C_2$ is connected directly across resistance $R_2$ when switch $S_2$ is closed, and since resistance $R_2$ is less than resistance $R_1$ plus resistance $R_2$, the discharge of condenser $C_2$ will usually be more rapid than that of condenser $C_1$, and the effect of the additional condenser will not be of importance a short time after switch $S_2$ is closed.

I have found that one set of suitable circuit constants when operating in accordance with Figure 5 is as follows:

$R_1$  400,000 ohms,
$R_2$  45,000 ohms,
$R_3$  100,000 ohms,
$C_1$  1 microfarad,
$C_2$  20 microfarads and
$V_c$  45 volts.

The second way of decreasing the initial change of plate current is by the use of an inductance or choke coil L connected in series with resistance $R_2$ and switch $S_2$ as shown in Figure 6. This coil, due to its inductive properties, will not permit an instantaneous change in the current flowing through it. This limits the initial rate of discharge of the condenser $C_1$, and by choice of a proper size of inductor the control grid voltage can be made to change very gradually just after the switch $S_2$ is closed. There is an advantage in placing the inductance in the circuit $R_2$—$S_2$—$V_c$—$R_3$ rather than in the circuit $R_1$—$R_3$—$V_c$—$C_1$, since the initial rush of current from the battery $V_c$ through resistances $R_2$ and $R_3$ is likewise limited, a point not achieved by placing L in the circuit $R_1$—$R_3$—$V_c$—$C_1$.

When using the circuit constants listed in the case of Figure 2, inductance L may suitably have a value of 50 henrys.

Figure 7:
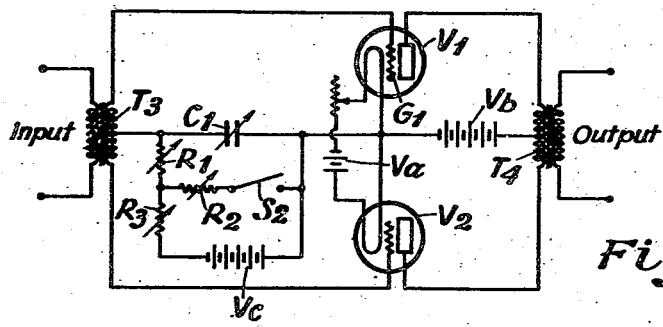

A third and different method of eliminating the surge of plate current which otherwise results from closing the switch $S_2$ is to use two identical vacuum tubes in a so-called "push-pull" circuit as shown in Figure 7. Neither the inductance L nor the extra condenser $C_2$ is needed in this circuit. In Figure 7, two center-tapped transformers $T_3$ and $T_4$ are used. In this circuit, any change in the average control grid voltages of the two identical vacuum tubes $V_1$ and $V_2$ causes equal changes in plate currents in the two tubes. The effects of the changes in these currents on the plate transformer $T_4$ are equal and opposite and hence there is no effect on the output. By use of this circuit, then, the initial rate of change of average control grid voltage has no effect on the recorded output of the amplifier. However, any signal from the seismometer will have opposite effects on the control grid voltages of the two tubes (due to the reversed effects caused by center-tapped transformer $T_3$) and thus will give an amplified signal in the output circuit. The amplification increases with decrease in average control grid voltage as previously described. Thus the advantages of the circuit of Figure 2 are obtained without the disadvantages of that circuit.

Although the vacuum tubes shown in the circuits of Figures 2, 5, 6 and 7 are of the three-electrode or triode type, there is no intention of limiting the application of this invention to this type of tube. Any thermionic tube suitable for amplification purposes can be used. I prefer to use the type of tube shown in Figure 8, which is well-known commercially as one variety of pentode, and this type of tube can be applied to any of the circuits previously discussed.

The pentode tube $V_3$ of Figure 8 is equipped (in addition to the elements of tube $V_1$) with suppressor gride $G_2$, grounded to the indirectly heated cathode, and screen grid $G_3$, the average voltage of which can be either equal to, greater than or less than the average plate voltage. The circuit of Figure 8 is otherwise similar to that of Figure 2. When using the type of tube shown in Figure 8, a wide variation of average control grid voltage can be used in the control of the plate current, so that the most advantageous characteristics of the tube and control circuit can be used.

As shown in Figures 2, 5, 6, 7 and 8 the amplification is varied by varying the bias on control grid $G_1$. However, this can also be accomplished by varying the bias on a screen grid or suppressor grid in a similar manner and this has certain advantages. One special advantage is that certain types of pentode tube exhibit more uniform amplification characteristics with screen grid control or suppressor grid control than with control grid control. In all three cases the control is effectuated by changing the grid bias in a positive direction by use of a discharging condenser as previously described. When using control grid control the negative bias is decreased, thus changing the grid bias in a positive direction. With suppressor grid control the negative grid bias is likewise decreased and the suppressor grid bias may even be driven to a positive value of a few volts. Using screen grid control the normal positive bias is increased.

Figure 9:
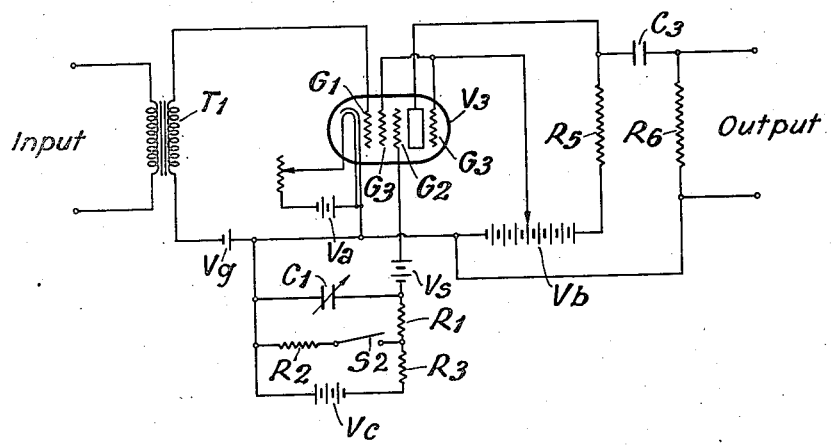

Figure 9, which corresponds in general to Figure 8, shows a hook-up for the use of suppressor grid control. Control battery $V_c$ produces a negative bias on suppressor grid $G_2$ which is decreased by battery $V_s$ to a suitable value. Closing switch $S_2$ initiates the transient, decreasing the voltage across condenser $C_1$ so that the negative voltage on suppressor grid $G_2$ decreases, preferably to zero or a few volts positive, thus increasing the amplification. The circuit of Figure 9 is resistance-condenser coupled to the output by resistances $R_5$ and $R_6$ and condenser $C_3$ but transformer coupling can be used.

Figure 10:
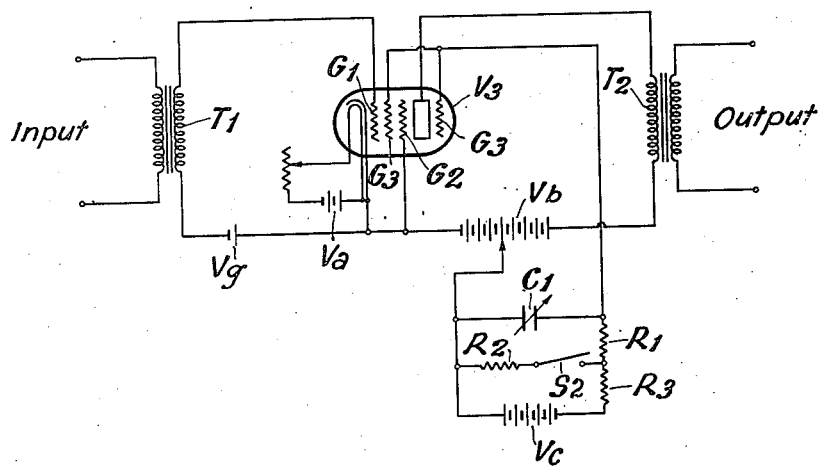

The use of screen grid control is illustrated in Figure 10. As in Figure 9 the right end of battery $V_c$ is negative instead of positive as in Figures 2, 5, 6, 7 and 8 and the tap on battery $V_b$ is adjusted so that the initial bias on screen grid $G_3$ is positive and of low voltage. Closing switch $S_2$ decreases the voltage across condenser $C_1$, increasing the positive bias on screen grid $G_3$ and increasing the amplification. In both Figures 9 and 10, the control grid $G_1$ is negatively biased by battery $V_g$.

While I have described my invention with particular reference to certain specific embodiments, it is to be understood that these are by way of illustration rather than by way of limitation. Numerous other applications of my invention will be apparent to those skilled in the art and I do not mean to be limited to the specific embodiments described but only to the broadest legitimate scope of the appended claims.

I claim:

1. A device for geophysical prospecting that comprises means to create seismic waves in the earth, means to detect said waves and translate them into electrical vibrations, means to amplify said electrical vibrations including at least one thermionic tube amplifier containing a plurality of tubes, means to vary the biasing potential on the grid of at least two tubes operating out of phase in said amplifier so as to control the degree of amplification of said vibrations without disturbing the base line thereof, and means to record said amplified vibrations.

2. A device for geophysical prospecting that comprises means to create seismic waves in the earth, means to detect said waves and translate them into electrical vibrations, means to amplify said electrical vibrations including at least one thermionic tube amplifier containing two tubes, means to vary the biasing potential on the grid of said tubes operating out of phase in said amplifier so as to control the degree of amplification of said vibrations without disturbing the base line thereof, and means to record said amplified vibrations.

3. Apparatus for receiving seismic waves and recording their effects, comprising means for receiving first a high energy refracted seismic wave and subsequently a multiplicity of low energy reflected seismic waves, means for converting all of said seismic waves into electrical waves, means for amplifying said electrical waves and for gradually and continuously increasing the amplification of said electrical waves in a definite predetermined relation to time during the time said various seismic waves are being received, and means for recording the effects of the amplified electrical waves, said means for amplifying said electrical waves and for gradually and continuously increasing the amplification of said electrical waves including at least one thermionic tube amplifier containing a plurality of tubes, means for varying the biasing potential on the grid of at least two tubes operating out of phase in said amplifier so as to control the degree of amplification of said electrical waves without disturbing the base line thereof.

4. Apparatus for receiving seismic waves and recording their effects, comprising means for receiving first a high energy refracted seismic wave and subsequently a multiplicity of low energy reflected seismic waves, means for converting all of said seismic waves into electrical waves, means for amplifying said electrical waves and for gradually and continuously increasing the amplification of said electrical waves in a definite predetermined relation to time during the time said various seismic waves are being received, and means for recording the effects of the amplified electrical waves, said means for amplifying said electrical waves and for gradually and continuously increasing the amplification of said electrical waves comprising a center-tapped input transformer, a center-tapped output transformer, a push-pull vacuum tube circuit including two vacuum tubes, said circuit connecting the secondary of said input transformer with the primary of said output transformer, means for biasing the grids of both tubes, means for simultaneously and continuously changing the grid biases of both tubes in a positive direction, and means for initiating the operation of said last named means, the said arrangement comprising the push-pull circuit serving to counteract surges otherwise incident to the operation of said initiating means, whereby the effects of high energy and low energy seismic waves are recorded in an improved manner in a single operation.

5. Apparatus for receiving seismic waves of generally decreasing amplitude and recording their effects, comprising a seismometer for converting seismic waves into corresponding electrical waves, an amplifier circuit to amplify said electrical waves, and means for recording the effects of the amplified electrical waves, said amplifier circuit comprising a vacuum tube, an input control grid circuit and an output plate circuit, said control grid circuit including a condenser connected between said grid and the cathode of said vacuum tube, an auxiliary constant source of potential for said condenser, a continuously closed circuit connecting said constant source of potential across said condenser, means to vary the potential delivered by said source to said condenser and for controlling the rate and extent of discharge of said condenser, comprising the combination of a first resistance, a second resistance, a third resistance and a switch, said first resistance, said second resistance, and said switch, exclusive of said third resistance, comprising a discharge circuit for said condenser, said continuously closed circuit for delivering potential from said potential source to said condenser including said potential source, said third resistance and said first resistance, the series resistance and said first resistance, the series combination of said second resistance and said switch being in parallel with the series combination of said condenser and said first resistance and in parallel with the series combination of said third resistance and said potential source, whereby the closure of said switch results in the gradual discharge of said condenser over a definite time period from an initial value with said switch open, which initial value is substantially the same as that of said potential source, to a final value with said switch closed and said condenser in a state of predetermined partial discharge, which final value is determined primarily by the relative magnitudes of said second resistance and said third resistance, whereby the effects of said seismic waves of generally decreasing amplitude are recorded in a single operation and whereby the amplitude range of the recorded waves is greatly reduced.

6. Apparatus for receiving seismic waves and recording their effects, comprising a seismometer for converting seismic waves of generally decreasing amplitude into corresponding electrical waves, an amplifier circuit to amplify said electrical waves, and means for recording the effects of the amplified electrical waves, said amplifier circuit comprising a vacuum tube, an input circuit, an output plate circuit, and an amplification control circuit including a grid, a condenser, an auxiliary constant source of potential for said condenser, a continuously closed circuit connecting said constant source of potential across said condenser connected between said grid and the cathode of said vacuum tube, means to vary the potential delivered by said source to said condenser and for controlling the rate and extent of discharge of said condenser, comprising the combination of a first resistance, a second resistance, a third resistance and a switch, said first resistance, second resistance, and said switch, exclusive of said third resistance, comprising a discharge circuit for said condenser, said continuously closed circuit for delivering potential from said potential source to said condenser including said potential source, said third resistance and said first resistance, said second resistance and said switch being in series with each other and in parallel with the series combination of said condenser and said first resistance and in parallel with the series combination of said third resistance and said potential source, whereby the closure of said switch results in the gradual discharge of said condenser over a definite time period from an initial value with said switch open, which initial value is substantially the same as that of said potential source, to a final value with said switch closed and said condenser in a state of predetermined partial discharge, which final value is determined primarily by the relative magnitudes of said second resistance and said third resistance, whereby the effects of said seismic waves of generally decreasing amplitude are recorded in a single operation and whereby the amplitude range of the recorded waves is greatly reduced.

7. A device according to claim 6 including a reactance for limiting the initial rate of discharge of the condenser, thus effecting a smoother time-discharge relationship.

8. A device according to claim 6 in which a second condenser having a capacity materially greater than that of the condenser described in claim 6 is connected in parallel with the series combination of said switching device and said second mentioned resistance, whereby the initial rate of discharge of the condenser described in claim 6 is limited, thus effecting a smoother time-discharge relationship.

RAYMOND T. CLOUD.